July 3, 1956

C. B. SEEM 2,753,144

DOUGH DIVIDER

Original Filed April 18, 1949

INVENTOR.
Charles B. Seem.
BY
Otto Moeller
ATTORNEY

July 3, 1956 C. B. SEEM 2,753,144
DOUGH DIVIDER
Original Filed April 18, 1949 3 Sheets-Sheet 2
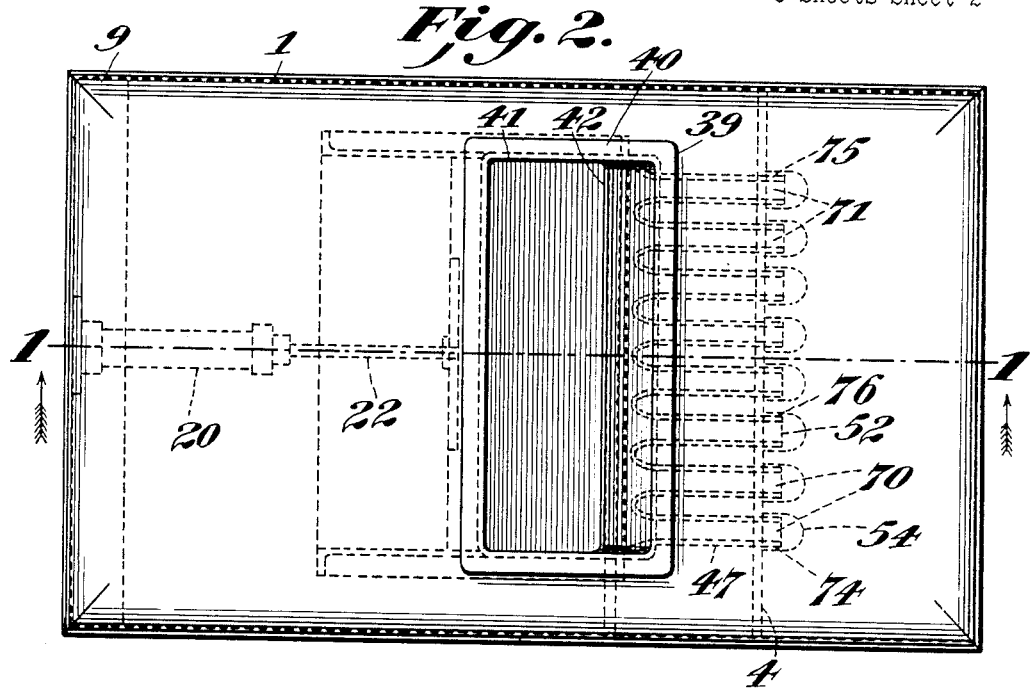
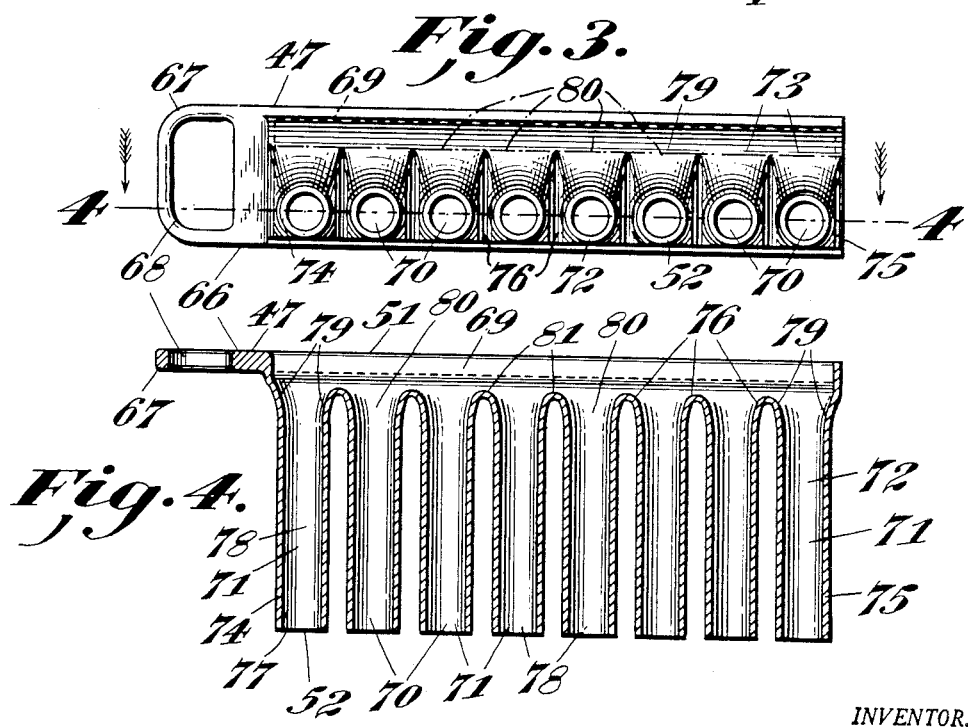
INVENTOR.
Charles B. Seem.
BY Otto Moeller
ATTORNEY

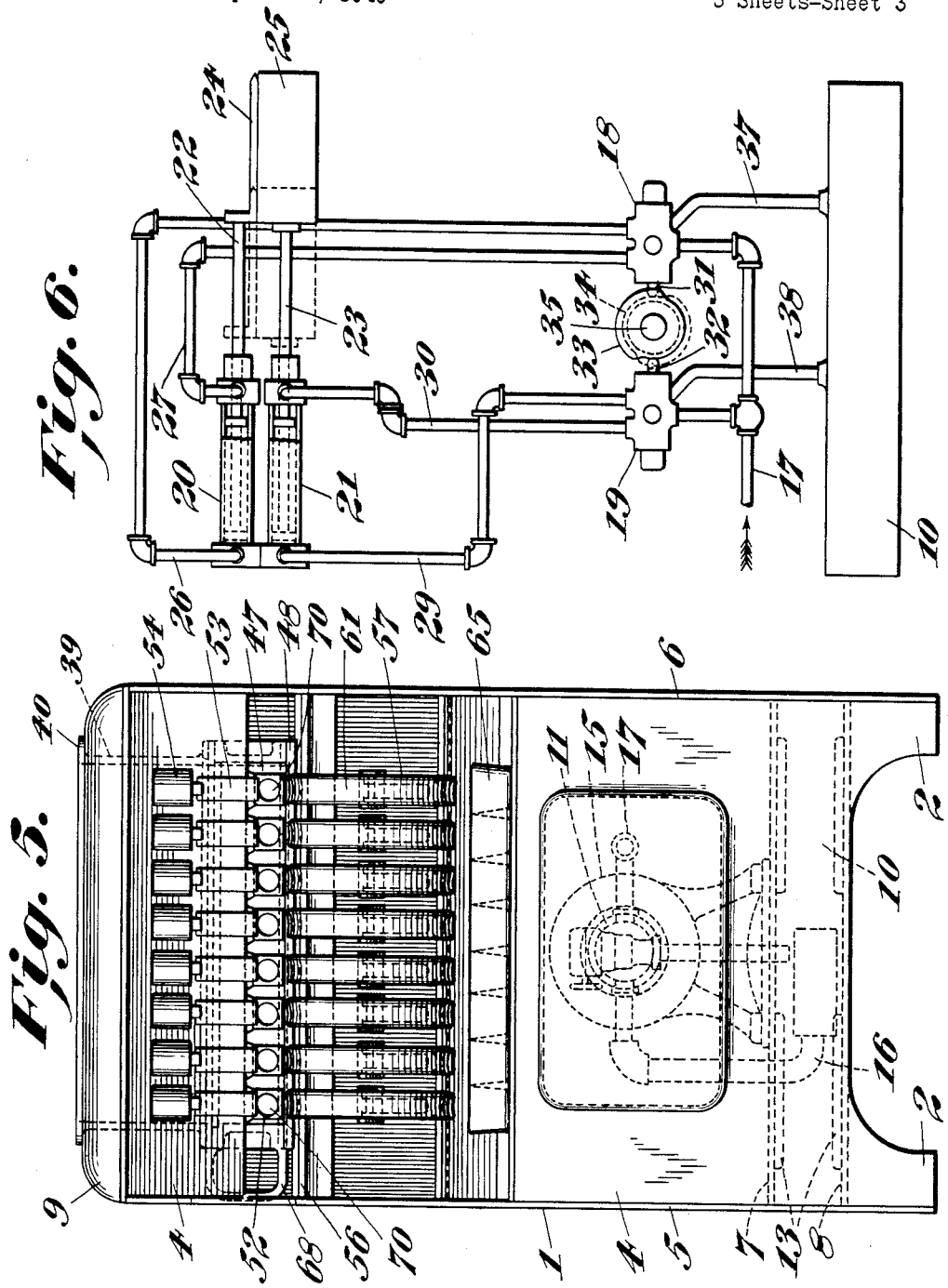

United States Patent Office 2,753,144
Patented July 3, 1956

2,753,144

DOUGH DIVIDER

Charles Benjamin Seem, Zionsville, Pa.

Original application April 18, 1949, Serial No. 88,111. Divided and this application April 16, 1953, Serial No. 349,221

3 Claims. (Cl. 249—5)

My invention relates broadly to improvements in bread dough handling apparatus and more particularly to an improved machine for dividing, molding, and weighing bread dough.

The present application is a division of my co-pending application Serial No. 88,111, filed April 18, 1949.

One of the objects of my invention is to provide an improved machine for dividing, molding, and scaling bread dough into loaves of conventional size and weight with a minimum of punishment to said dough and with a minimum of disturbance to the gaseous bubbles distributed throughout the dough.

Another object of my invention is to provide an improved machine for dividing and molding and scaling bread dough into loaves of conventional size and weight with a minimum of cutting of said dough, thus minimizing the escape of the gaseous bubbles contained in said dough.

Another object of my invention is to provide an improved molding and dividing head which is adapted to divide a mass of bread dough into a plurality of sections, and simultaneously knead, fold, and seal said dough sections while the dough is being pushed through said dividing and molding head.

In present day bread dough dividers, a system called the volumetric system is used to form loaves of dough of approximate standard weight. In the volumetric system, the dough is forced into so-called scaling pockets at an approximate pressure of from twenty to forty pounds per square inch, at the same time shearing the dough on five sides of the cube of a dough piece, the object being to forcibly eject the gaseous bubbles from the dough so that the varying expansion factors will be eliminated and a standard material weight of loaf can be obtained. The severe punishment given the dough in the volumetric type of machine liberates a large portion of the gases from the dough, and makes further steps necessary to revive the dough before it is baked. The first step after ejecting the loaf from the divider in the volumetric system is to put the dough in a rounder to seal up the raw sides which have been produced by the shearing of the dough; the next step is to place the dough in a proofer and keep it therein until it has recuperated, that is, until it has generated sufficient gaseous bubbles to replace those forced out in the divider; the next step is to place the dough in a molder which shapes the pieces for panning.

In the improved machine comprising my invention, the dough receives very little punishment, but is divided, molded and weighed to exact weights and deposited into the pans, making unnecessary the three steps and the use of the three pieces of auxiliary equipment described above. The rounder is eliminated as no raw edges are left on the dough in its passage through my improved dividing head; the proofer is eliminated as the gas bubbles have not been expelled from the dough in its passage through my improved dviding head; and the molder is eliminated because the dough is molded as it passes through the improved dividing head of my machine.

Further advantages and objects of my invention will become apparent from a study of the following specification taken in connection with the drawings, wherein Figure 1 is a vertical cross section of a machine constructed according to my invention taken along line 1—1 of Figure 2 in the direction indicated by the arrows;

Figure 2 is a top plan view of the machine of my invention;

Figure 3 is a front elevation of my novel dividing and molding head;

Figure 4 is a section taken along line 4—4 of Figure 3 in the direction indicated by the arrows;

Figure 5 is a front elevation of my novel machine; and

Figure 6 is a diagrammatic view showing an arrangement for operating my machine hydraulically.

Figure 1:
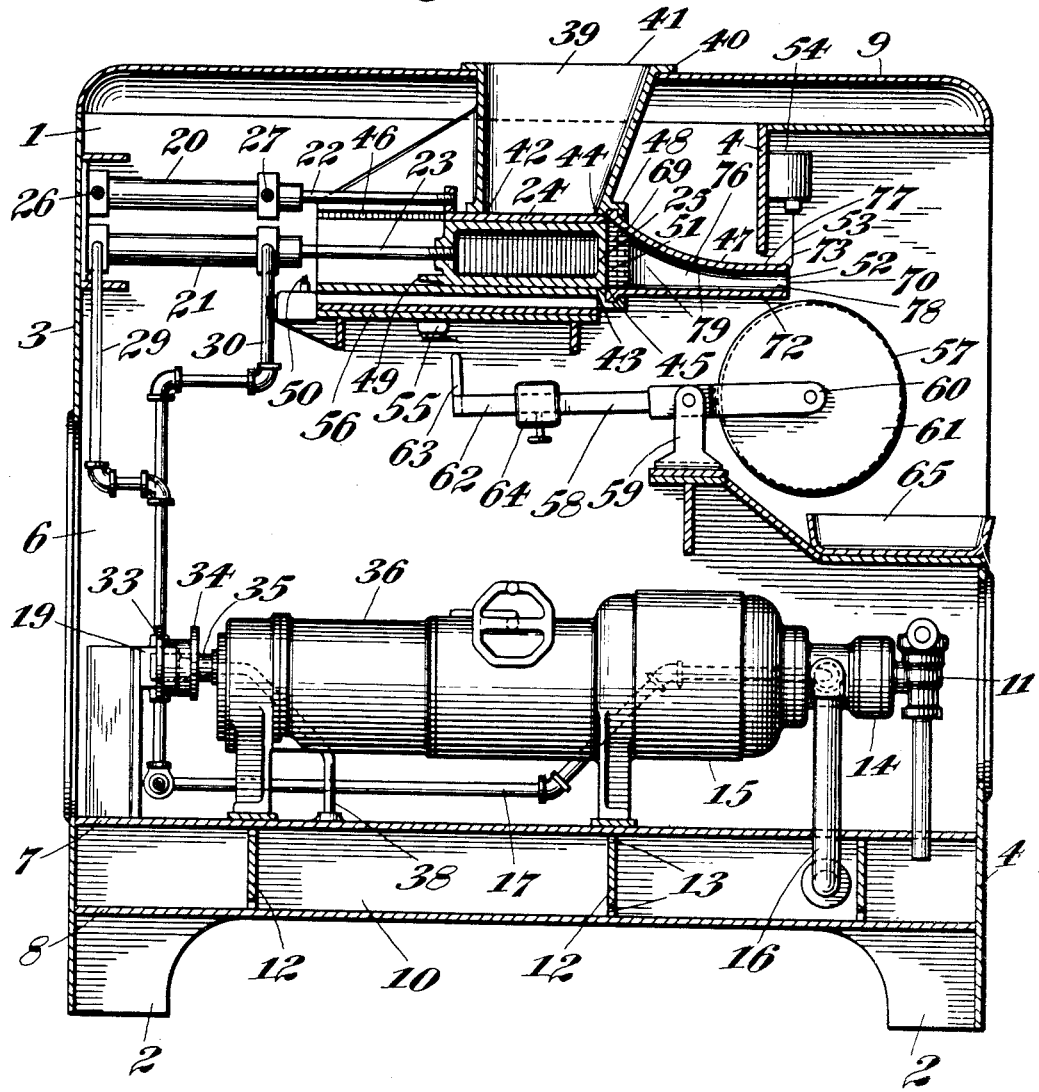

Referring to the drawings more in detail, 1 designates a box-like structure comprising a housing to support the various elements of my improved machine. Said housing comprises feet 2, backwall 3, front wall 4, side walls 5 and 6, floor members 7 and 8, and cover 9. Floor members 7 and 8 constitute a tank 10 for storage of oil or other liquid for the hydraulic pumping unit 11 which is mounted on floor member 7. Reenforcing members 12 are provided intermediate members 7 and 8. The members 12 are provided with orifices 13 at the upper and lower extremities thereof to allow free access of the oil to all parts of the tank 10. Pumping unit 11 comprises a pump 14 and a motor 15 operatively connected to said pump 14 to actuate said pump 14 to pump oil or liquid from the supply tank 10. A pipe 16 connects the pump 14 to the tank 10. Pipe 17 connects said pump 14 to four-way cam-operated valve 18 and conveys oil under pressure to said valve 18, see Figure 6, and to four-way cam-operated valve 19 located at the end of the pumping unit 11 opposite pump 14. Hydraulic cylinders 20 and 21 are mounted adjacent the top of the housing and are provided with pistons 22 and 23, respectively, the piston 22 being connected to the hopper knife 24 and piston 23 being connected to the reciprocating dough pushing plunger 25. One end of pipes 26 and 27 are connected to the rearward and forward ends, respectively, of hydraulic cylinder 20, the other end of the pipes being connected to the four way cam-operated valve 18, and oil is conducted to and from said cylinder 20 by said pipes 26 and 27. In a similar manner, pipes 29 and 30 are connected to valve 19 and cylinder 21. Valves 18 and 19 are reversing being provided with plungers 31 and 32, respectively, which move in and out to change the direction of flow of oil through valves 18 and 19 in response to movement of cams 33 and 34, which are mounted on shaft 35 turned by speed ranger 36 powered by motor 15. The hopper knife 24 and dough plunger 25 are moved to their forward position as shown in full lines in Figures 1 and 6 when the pistons 22 and 23, respectively, are pushed forward by oil under pressure entering the rearward end of cylinders 20 and 21, respectively, through pipes 26 and 29, respectively, while oil in the forward end of the cylinders is exhausted at the same time through pipes 27 and 30, respectively. When the valves 18 and 19 are reversed, oil is pumped under pressure into the forward end of the cylinders 20 and 21 through pipes 27 and 30, respectively, thereby moving the pistons 22 and 23, respectively, the hopper knife 24, and the dough plunger 25 to their rearward positions as shown in dotted lines in Figure 6. The oil in the rearward end of these cylinders is at the same time exhausted through the pipes 26 and 29, through valves 18 and 19 and pipes 37 and 38, which connect the valves 18 and 19 to the tank 10.

The cover 9 is provided with an opening through which dough hopper 39 extends and the upper portion of the hopper 39 is provided with a flange 40 for engaging the upper surface of the cover 9. The dough hopper 39 is provided with top and bottom openings 41 and 42, respectively, for the entrance and exit of the dough to be divided. Immediately below hopper 39 is provided a dough receiving chamber 43 which receives dough from said hopper 39, through chamber entrance 44. Chamber 43 is provided with a dough exit 45 through which the dough is pushed by plunger 25. The horizontally reciprocating hopper knife 24 is mounted in slots 46 so as to move back and forth across the bottom opening 42 of hopper 39 and entrance 44 of chamber 43 in order to cut off portions of dough fed through said hopper 39 to the chamber 43. The horizontally reciprocating plunger 25 is mounted in chamber 43 and is provided to push the dough out of chamber 43 and through my novel dividing and molding head 47 which is removably mounted in frame 48 immediately adjacent the exit 45 of chamber 43. The plunger 25 is provided at its rear end with a rearwardly extending lug 49 which trips the switch 50 when the plunger 25 is at the rearward end of its stroke.

The dividing and molding head 47 is provided with dough entrance and exit portions 51 and 52, respectively. Over the exit portions 52 are provided a plurality of guillotine knives 53, one for each exit, for the purpose of cutting the dough into portions of desired weight. The knives 53 are actuated by solenoids 54 which are mounted on the front wall 4 and which are actuated electrically through switch 55, which is mounted on frame support 56 beneath chamber 43, to drop the knives, and through switch 50 to lift the knives. Below the exit portions 52 are provided weighing devices 57, each of which comprises a scale beam 58, pivoted in standard 59 and having at end 60 a rotating dough-receiving wheel 61 situated below exit 52 of head 47. At the other end 62 of scale beam 58 is provided a lug 63, which is adapted, when end 62 is tipped up, to trip the switch 55 which drops the knife 53. A counter-weight 64 is slidably mounted on scale beam 58 to determine the response of the scale beam 58 to various weights of dough received by wheel 61. Below the wheels 61 is provided a multiple pan 65 to receive the dough from wheels 61.

To describe the dividing and molding head 47 more in detail, reference is had to Figures 1, 3, and 4. The body portion 66 of the head 47, as shown in Figure 3 in elevation, is rectangular in shape and at one end 67 a rectangular opening therein provides a hand-hold 68 for convenience in sliding said head 47 into and out of assembly with frame 48. The body portion 66 is provided with a dough entrance portion 51 having a large rectangular opening 69, and a dough exit portion 52 having a plurality of openings 70. Extending from the dough entrance portion 51 to the dough exit portion 52 are a plurality of passages 71. To form the passages 71, the body portion is provided with relatively straight horizontal bottom walls 72, top walls 73, side walls 74 and 75, and spaced partition walls 76 intermediate the side walls 74 and 75.

The partition walls 76 may have relatively thin spaced apart sections, as shown in the drawings, or may be a solid section intermediate the passages 71. The side walls, top walls, and partition walls are provided with substantially straight portions 77 adjacent the openings 70 of the exit portion 52 to define a relatively restricted portion 78 of the passages 71. The said walls are also provided with outwardly curved portions 79 to define relatively enlarged dough entrance portions 80 of the passages 71.

The partitions 76 are provided with arcuate portions 81 adjacent the dough entrance portion 51 which connect the outwardly curved portions 79 of the partition walls. As dough is pushed into the head 47 by the plunger 25, the dough moves against and pass these arcuate portions 81 and is gently divided with no tearing, and then moves into the relatively enlarged portions 80 of the passages 71 and is gradually compressed into the relatively restricted portions 78 of the passages where it is given a kneading and molding treatment until it is pushed through the exit openings 70.

In the operation of the machine, hopper 39 is first filled with dough, hopper knife 24 and plunger 25, actuated by pistons 22 and 23, respectively, are drawn out of the dough receiving chamber 43 and a portion of dough drops by gravity down out of the hopper 39 through chamber entrance 44 into the chamber 43. Hopper knife 24 then is pushed across the bottom opening 42 of the hopper 39, cutting off the dough and sealing the bottom opening 42 of the hopper. The plunger 25, actuated by piston 23, then moves forward into chamber 43, pushing the dough before it into the dividing and molding head 47. As the dough is pushed against the well rounded arcuate portions 81 of partitions 76, it is divided into a plurality of sections, and is gently folded, stretched, and kneaded with no tearing or cutting as it proceeds through passages 71. Little pressure being required for this operation, the dough is not punished or caused to lose its gas bubbles. As the dough is pushed through the passages 71 it is well sealed and molded by the time it is pushed out of the passage exists 79, when it deposits on wheels 61 which turn slightly as the dough moves outwardly. When a predetermined weight of dough accumulates on each wheel, the weight overcomes the effect of the counterweight 64 and the scale beam 58 tips, the wheel moving downwardly and end 62 of the scale beam 58 moving upwardly until lug 63 trips switch 55 actuating solenoid 54 to move knife 53 downwardly across the passage exits 70 cutting off the current weight of dough and sealing the dough at the same time. When the dough is thus severed, the weight of said dough actuates the wheel 61, to turn and deposit the dough into pan 65. The plunger 25 and the hopper knife 24 then move again out of chamber 43 whereupon the rearwardly extending lug 49 on the rear end of plunger 25 trips switch 50 which electrically actuates solenoid 54 to move knife 53 upwardly into starting position as shown in Figures 1 and 5, more dough dropping into chamber 43 and the entire operation being repeated.

It will be seen, from the foregoing description, that as there is little resistance to the passage of the dough, when pushed by the plunger through my novel dividing head, very little punishment of the dough will take place, and as there is no shearing of the dough as it is pushed over the well rounded division portions no loss of gas bubbles is caused by this operation, and the dough is well molded by the time it leaves the dividing head. The divided and scaled dough in pans can then be transferred into the steam chest for final proofing ready for baking, thus eliminating the three pieces of additional apparatus required by the present volumetric dividers, i. e., rounder, proofer, and molder.

In as much as the dividing head of my invention is removable, it can be easily cleaned or replaced by one of slightly different shape to produce varying shapes of loaves, and varying types of bread products.

Although I have described and illustrated my invention in considerable detail, I do not wish to be limited to the exact and specific details thereof as shown and described, but I may use such modifications, substitutions, or equivalents thereof as are embraced within the scope of my invention or as are pointed out in the appended claims.

I claim:

1. A dough divider comprising a dough chamber having an outlet portion with a discharge opening, means in said chamber for forcing dough through said discharge opening, dough receiving means rotatably mounted beneath said discharge opening to be rotated by the weight of the dough as it is discharged from said opening, dough severing means independent of said dough receiving means movable across said opening to sever the dough discharged from said opening, electromagnetic means connected with said severing means for operating said severing means, and a control switch in circuit with said electro-magnetic means disposed in operative relation with said dough receiving means to be actuated upon movement by said receiving means under the influence of discharged dough for energizing said electromagnetic means to operate said severing means.

2. A dough divider as defined in claim 1 wherein said dough chamber outlet portion comprises an elongated passage gradually convergent from said chamber to said discharge opening, and said dough receiving means comprises a scale beam pivotally mounted beneath said chamber and passage.

3. A dough divider as defined in claim 1 having means operable by said means in said chamber for actuating said electro-magnetic means to retract said severing means.

References Cited in the file of this patent

UNITED STATES PATENTS

| | | |
|---|---|---|
| 729,149 | Fenn | May 26, 1903 |
| 782,338 | Hicks | Feb. 14, 1905 |
| 794,215 | Corby | July 11, 1905 |
| 824,008 | Gowdy | June 19, 1906 |
| 1,003,543 | Streich | Sept. 19, 1911 |
| 1,041,278 | Hayssen | Oct. 15, 1912 |
| 1,217,778 | Kirchhoff | Feb. 27, 1917 |

FOREIGN PATENTS

| | | |
|---|---|---|
| 132,101 | Germany | June 27, 1902 |